No. 779,882. PATENTED JAN. 10, 1905.
B. SIMPSON.
TEST MEASURE.
APPLICATION FILED MAR. 29, 1904.
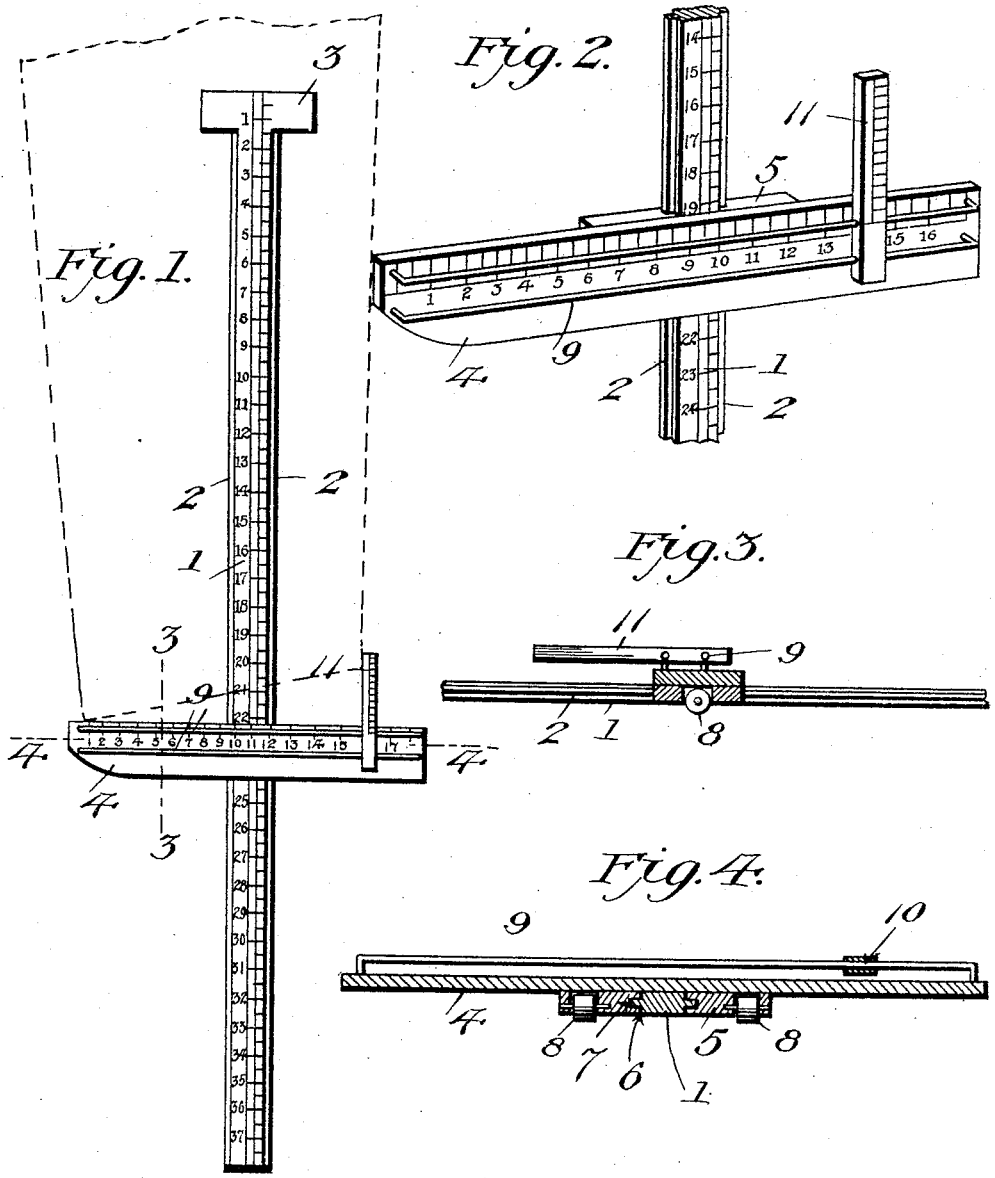
Witnesses
Geo Ackman
Herbert D Lawson
Inventor
Bryant Simpson,
By Victor J. Evans
Attorney No. 779,882.                                                        Patented January 10, 1905.

UNITED STATES PATENT OFFICE.

BRYANT SIMPSON, OF WESTPOINT, GEORGIA.

TEST-MEASURE.

SPECIFICATION forming part of Letters Patent No. 779,882, dated January 10, 1905.

Application filed March 29, 1904. Serial No. 200,625.

*To all whom it may concern:*

Be it known that I, BRYANT SIMPSON, a citizen of the United States, residing at Westpoint, in the county of Troup and State of Georgia, have invented new and useful Improvements in Test-Measures, of which the following is a specification.

My invention relates to new and useful improvements in measures for use by tailors; and its object is to provide a simple and efficient device for measuring trousers, so as to determine whether or not the same are of a required size.

The invention consists of a combination of graduated strips which are so arranged in relation to each other as to permit the length of the inseam of a trousers-leg, the length of the bottom of the trousers-leg, and the height of the instep to be determined at one measurement.

The invention also consists in the further novel construction and combination of parts hereinafter more fully described and claimed, and illustrated in the accompanying drawings, showing the preferred form of my invention, and in which—

Figure 1 is a front elevation of the measure. Fig. 2 is a perspective view of the adjustable portions thereof. Fig. 3 is a section on line 3 3, Fig. 1; and Fig. 4 is a section on line 4 4, Fig. 1.

Referring to the figures by numerals of reference, 1 is a graduated strip having ribs 2 on the sides thereof, and a head 3 is formed at one end of this strip. The strip is preferably graduated to indicate inches. Slidably mounted upon the strip 1 is a cross-strip 4, having blocks 5 upon the rear face thereof which are spaced apart to form a recess 6 for the reception of the strip 1, and the side walls of this recess have grooves 7 for the reception of the ribs 2. Rollers 8 are journaled in the block 5 and form a bearing for said block when the measure is laid flat upon a counter or table and it is desired to adjust the strip 4. Parallel rods 9 are arranged longitudinally upon the strip 4 and extend through passages 10, which are formed within a graduated instep-measure 11, which extends at right angles from the strip 4. It will be understood that the strip 4 is also graduated to indicate inches.

When it is desired to measure a pair of trousers, the strip 1 is placed along the inseam of one of the trousers-legs and strip 4 is slid along the strip 1 until the same is brought into position at the lower end of the trousers-leg. This strip 4 will accurately indicate the width of said end, and by adjusting the strip 11 on the rods 9 the height of the instep at said end of the trousers-leg can be readily determined.

It will be understood that the measure can be formed of any suitable material, sheet metal, cloth, or wood, &c. Moreover, if desired, the rollers may be dispensed with.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. In a measure of the character described, the combination with a graduated strip; of a second graduated strip slidably mounted thereon and arranged at right angles thereto, a guide-rod upon said second strip, and an instep-measure slidably mounted upon the rod and extending at right angles thereto.

2. In a measure of the character described, the combination with a graduated strip having a head at one end thereof and ribs at the sides of the strip; of a second graduated strip slidably mounted upon the first-mentioned strip and engaging the ribs, guide-rods upon said second strip, and a graduated instep-measure slidably mounted upon the guide-rods and extending at right angles thereto.

3. The combination with a graduated strip having a head at one end and ribs at the sides thereof; of a graduated cross-strip slidably mounted thereon and engaging the ribs, rollers journaled within the cross-strip, parallel longitudinally-extending guide-rods upon the cross-strip, and a graduated instep-measure slidably mounted upon the rods and extending at right angles therefrom.

In testimony whereof I affix my signature in presence of two witnesses.

BRYANT SIMPSON.

Witnesses:
   A. HUGULEY,
   MARK McCULLOH.